United States Patent [19]

Kalyanaraman

[11] Patent Number: 4,977,068
[45] Date of Patent: Dec. 11, 1990

[54] SILOXY SUBSTITUTED NAPHTHALOCYANINES AND METHOD OF PREPARATION

[75] Inventor: Palaiyur S. Kalyanaraman, Fanwood, N.J.

[73] Assignee: Hoechst Celanese Corp., Somerville, N.J.

[21] Appl. No.: 490,875

[22] Filed: Mar. 9, 1990

[51] Int. Cl.$^5$ .................... G03C 1/00; G03C 1/492; C09B 47/04; C09B 47/10
[52] U.S. Cl. .................................. 430/495; 430/270; 430/945; 540/128; 540/138; 540/140; 428/64
[58] Field of Search .................. 430/495, 945, 270; 540/128, 140, 138

[56] References Cited

U.S. PATENT DOCUMENTS

| | | | |
|---|---|---|---|
| 4,132,842 | 1/1979 | Wynne et al. | 528/33 |
| 4,492,750 | 1/1985 | Law et al. | 430/270 |
| 4,725,525 | 2/1988 | Kenney et al. | 430/270 |

FOREIGN PATENT DOCUMENTS 1-105788  4/1989  Japan .................. 430/945

*Primary Examiner*—Paul R. Michl
*Assistant Examiner*—Ashley Pezzner
*Attorney, Agent, or Firm*—Burns, Doane, Swecker & Mathis

[57] ABSTRACT

Provided is a novel aromatic ether capped naphthalocyanine compound containing a central hetero atom having a siloxy group substituent off of said hetero atom, with said siloxy substituent having the formula

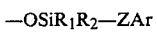

wherein $R_1$ and $R_2$ can be the same or different, and can be alkyl having from 1 to about 18 carbons; aryl having from 6 to 10 carbons; cycloalkyl having at least 4 carbons or alkoxy having at least 3 carbons, Z is O or S, and Ar is an aromatic moiety.

Also provided is a process for preparing a naphthalocyanine compound containing a central hetero atom having a siloxy group substituent off of said hetero atom, with said siloxy group containing a terminal ether function, which process comprises reacting in the presence of a nucleophile in a moisture free environment (i) a naphthalocyanine dihydroxy compound,
(ii) a compound of the formula $SiR_1R_2L_2$, wherein $R_1$ and $R_2$ can be the same or different and can be alkyl having from 1 to about 18 carbons; aryl having from 6 to 10 carbons; cycloalkyl having at least 4 carbons or alkoxy having at least 3 carbons, and L is a halogen, and
(iii) an ether capping group compound, wherein the ether capping group compound is added to the reaction medium under moisture free conditions.

36 Claims, No Drawings

SILOXY SUBSTITUTED NAPHTHALOCYANINES AND METHOD OF PREPARATION

BACKGROUND OF THE INVENTION

1. Field of the Invention

This invention relates to novel siloxy substituted naphthalocyanines, and a process for their preparation. The present invention also relates to useful applications of the siloxy substituted naphthalocyanines, e.g., in the information layer of an optical information medium.

2. Description of the Prior Art

Optical recording methods in which light from a laser is focused upon the surface of a recording medium with sufficient intensity to cause a detectable change in the physical characteristics of the surface material have been proposed. Among these methods is the establishment of an information pattern of pits. In such methods, the information representative pattern of pits may be formed in the surface of the recording medium by suitably controlling the intensity of the focused light in accordance with the information to be recorded while relative motion is established between the recording medium and the focused light spot.

Organic materials have been employed as the recording layer for optical data storage media, as described by Kuder in the *Journal of Imaging Technology*, Vol. 12, No. 3, pp. 140-143. These are typically thin films comprising either a dye in a polymer matrix, or a dye only. Organic recording layers are often more sensitive to the write laser beam than metal films due both to lower melting or softening temperatures and to low thermoconductivity. While metal films are typically sensitive to a broad spectrum of wavelengths, dyes used in organic media are narrow absorbers that must be carefully chosen so that the absorption matches the laser wavelength employed for writing. This disadvantage has led to a search for chromophores useful in optical data storage media which are sensitive specific to laser wavelengths.

The use of organic materials such as phthalocyanine and naphthalocyanine chromophores in optical recording media is known to the art. For example, the use of phthalocyanine dyes in conjunction with optical recording media comprising a styrene oligomer is disclosed in an article by Kuroiwa et al appearing in the *Japanese Journal of Applied Physics*, Vol. 22, No. 2, February 1983, pp. 340-343. Among the dyes and pigments discussed as being useful is a copper phthalocyanine pigment. The phthalocyanine dye conferred sensitivity to the helium-neon laser beam employed for data storage.

Japanese Patent Application No. 57-173, 749, published Apr. 9, 1984, of Kuroiwa et al, discloses an optical recording medium having alleged improved sensitivity. The recording medium comprises a recording layer composed of a polymer having a phthalocyanine residual group as a side chain.

Other publications which discuss the usefulness of various phthalocyanine chromophores in the recording layer optical information media include U.S. Pat. Nos. 4,241,355; 4,298,971; 4,458,004 and 4,529,688.

Publications discussing the usefulness of naphthalocyanine chromophores in the recording or information layer of optical information media also exist.

For example, U.S. Pat. No. 4,492,750 discloses an ablative infrared-sensitive optical recording composition containing as a component thereof a dispersion of a resinous binder and a soluble naphthalocyanine.

U.S. Pat. No. 4,725,525 discloses the use of various substituted naphthalocyanine compounds, including siloxy substituted naphthalocyanines chromophores, in optical recording media, as does Japanese Kokai No. 177288, published Aug. 8, 1986.

The recording medium, of course, is one of the key elements in any optical recording system, i.e., a system in which the information is recorded or read by light. Such a system would have a usefulness in the storage of audio and video information, data processing and document processing. The commercial viability of an optical recording medium would of course depend upon such technical parameters as the sharpness in recording and playback of the information, i.e., a high signal to noise ratio, as well as the useful life of the information medium. Maintaining the sensitivity of a recording medium throughout the cycles of record-read-erase is also an important consideration.

While dyes or pigments, including naphthalocyanine compounds, have been employed in information storage layers due to their excellent absorption properties, the search for an improved optical information storage medium exhibiting stability and intense absorption at specified wavelengths is continuously ongoing. The search for new and improved naphthalocyanine compounds for use in optical information media, as well as in other optical applications, is also continuously ongoing.

Accordingly, it is a major object of the present invention to provide novel naphthalocyanine chromophores which are useful in optical information media applications.

Another object of the present invention is to provide novel siloxy substituted naphthalocyanines, which are useful in formulating the information layer of an optical information medium.

Yet another object of the present invention is to provide a process for synthesizing siloxy substituted naphthalocyanines.

Still another object of the present invention is to provide a novel optical information medium which contains an information layer comprised of such siloxy substituted naphthalocyanines.

These and other objects, as well as the scope, nature and utilization of the invention, will be apparent to those skilled in the art from the following description and the appended claims.

SUMMARY OF THE INVENTION

In accordance with the foregoing objectives, there is provided a naphthalocyanine compound containing a central hetero atom having a siloxy group substituent off of said hetero atom, with said siloxy substituent having the formula

—$OSiR_1R_2$—ZAr wherein
  $R_1$ and $R_2$ can be the same or different, and can be alkyl having from 1 to about 18 carbons; aryl having from 6 to 10 carbons; cycloalkyl having at least 4 carbons or alkoxy having at least 3 carbons,
  Z is O or S, and
  Ar is an aromatic moiety.

In a most preferred embodiment, the naphthalocyanine compound is of the general formula

wherein
Y is Si, Ge, Sn, Al, Ga, In or a transition metal,
Nc is a naphthalocyanine moiety
$R_1$ and $R_2$ can be the same or different and can be alkyl having from 1 to about 18 carbons; aryl having from 6 to 10 carbons; cycloalkyl having at least 4 carbons or alkoxy having at least 3 carbons,
Z is O or S,
Ar is an aromatic moiety, and
n is 1 or 2.

A polymerized form of the siloxy substituted naphthalocyanine compounds of the present invention is also contemplated. The aromatic ether terminated siloxy substituted naphthalocyanine compounds of the present invention find many optical applications, e.g., in optical information media or laser printer paper.

The present invention also provides a process for most effectively and efficiently preparing a naphthalocyanine compound containing a central hetero atom having a siloxy group substituent off of said hetero atom, with said siloxy group containing a terminal ether function, which process comprises reacting in the presence of a nucleophile in a moisture free environment
(i) a naphthalocyanine dihydroxy compound,
(ii) a compound of the formula $SiR_1R_2L_2$, wherein $R_1$ and $R_2$ can be the same or different and can be alkyl having from 1 to about 18 carbons; aryl having from 6 to 10 carbons; cycloalkyl having at least 4 carbons or alkoxy having at least 3 carbons, and L is a halogen, and
(iii) an ether capping group compound, wherein the ether capping group compound is added to the reaction medium under a moisture free environment. The process is extremely effective and efficient in preparing any ether capped siloxy substituted naphthalocyanine compound, but is most important in the synthesis of such aromatic ether capped compounds. For without the process of the present invention the synthesis of such aromatic ether capped compounds has heretofore been unknown.

DETAILED DESCRIPTION OF THE PREFERRED EMBODIMENTS

The novel naphthalocyanine compounds of the present invention have aromatic ether capped siloxy substituents off of the central atom of the naphthalocyanine compound. The siloxy substituent has the general formula

It is most preferred that $R_1$ and $R_2$ are lower alkyl and that Z is oxygen.

The aromatic moiety Ar can be generally any aromatic containing moiety, e.g., phenyl, naphthyl, phenanthyrl, etc. It is preferred that the aromatic moiety contain from 6 to 14 carbons, and most preferably from 6 to 10 carbons. It is most preferred that the aromatic moiety Ar comprise a phenyl or naphthyl moiety.

The aromatic moiety Ar can be substituted or unsubstituted. When substituted, it is preferred that the substituents be comprised of a halogen, $NO_2$, hydroxy, alkyl, alkoxy, $—COCH_3$, aryloxy or aryl substituent.

Examples of suitable aromatic moieties include the following

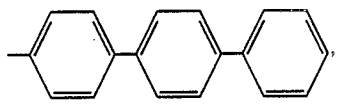

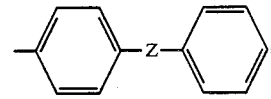

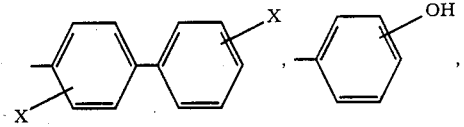

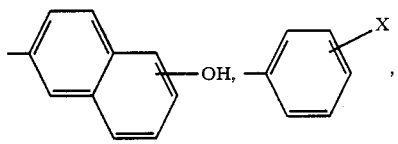

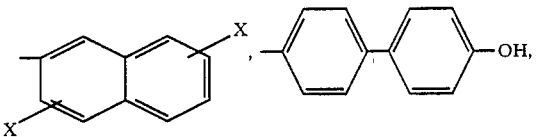

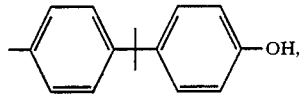

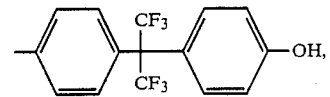

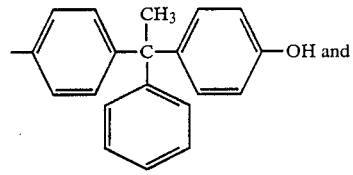

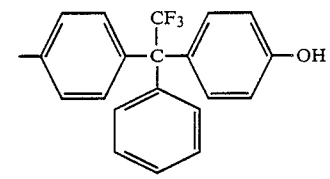

wherein Z is O or S, and X is H, halogen, $NO_2$, alkyl, alkoxy, $—COCH_3$, aryloxy or aryl.

The aromatic ether capped siloxy substituted naphthalocyanines of the present invention are preferably of the form having the general formula

wherein

Y is Si, Ge, Sn, Al, Ga, In or a transition metal,
Nc is a naphthalocyanine moiety
$R_1$ and $R_2$ can be the same or different and can be alkyl having from 1 to about 18 carbons; aryl having from 6 to 10 carbons; cycloalkyl having at least 4 carbons or alkoxy having at least 3 carbons,
Z is O or S,
Ar is an aromatic moiety, and
n is 1 or 2.

However, the present invention also contemplates naphthalocyanines in polymerized form having the following general formula $$[R_1R_2YO-(YNc)-OYR_1R_2-O-Ar-O]_m$$

wherein
Y is Si, Ge or Sn,
Nc is a naphthalocyanine moiety,
$R_1$ and $R_2$ can be the same or different and can be alkyl having from 1 to about 18 carbons; aryl having from 6 to 10 carbons; cycloalkyl having at least 4 carbons or alkoxy having at least 3 carbons,
Ar is an aromatic moiety, preferably as defined above, and
m is greater than 2.

It is most preferred that the naphthalocyanines of the present invention are silicon naphthalocyanines. The aromatic rings of the naphthalocyanine moiety can also be substituted or unsubstituted. Indeed, by choosing a particular substituent in combination with a particular central hetero atom, the solubility and absorption properties can be desirably affected.

The aromatic ether capped siloxy substituted naphthalocyanines of the present invention are synthesized by the novel process of the present invention. The process of the present invention comprises reacting in the presence of a nucleophile in a moisture free environment.
(i) a naphthalocyanine dihydroxy compound,
(ii) a compound of the formula $SiR_1R_2L_2$, wherein $R_1$ and $R_2$ can be the same or different and can be alkyl having from 1 to about 18 carbons; aryl having from 6 to 10 carbons; cycloalkyl having at least 4 carbons or alkoxy having at least 3 carbons, and L is a halogen, and
(iii) an ether capping group compound, wherein the ether capping group compound is added to the reaction medium under moisture free conditions.

The process is run under a total moisture free environment, i.e., substantially all moisture is excluded from the reaction environment. The most important feature of the present process in the realization of this requirement is the addition of the ether capping group compound to the reaction under moisture free conditions. This means that the handling and addition of the capping group compound should be under moisture free conditions. For it is through observing this particular process parameter that the effectiveness and efficiency of the present process for providing the desired product is realized. Prior attempts to synthesize the aromatic ether capped siloxy substituted compounds of the present invention have been found to be ineffective. Substantially no product was obtained. It was not until the present process was discovered, wherein the ether capping group compound is added to the reaction under a moisture free environment, and under moisture free conditions, that the aromatic ether capped siloxy substituted compounds were successfully synthesized.

It should be noted that the process of the present invention is also applicable to aliphatic ether capped siloxy substituted compounds, and preferably aliphatic ether moieties comprised of lower alkyl ether moieties containing from 1 to 3 carbons. Such compounds can be synthesized without the moisture free handling and addition of the capping group compound, but it has been found that the process of the present invention can provide much improved yields and selectivity when employed in the synthesis of even aliphatic ether capped siloxy substituted naphthalocyanine compounds.

The process of the present invention, more particularly, involves reacting the three reactants in the presence of a nucleophile in a moisture free environment. The nucleophile is essentially a basic catalyst for the reaction, and can be any strong base which does not react with the ether capping group compound. The preferred nucleophiles are tertiary amines, with tributyl amine being the most preferred. If preferred, the nucleophile can be dried over molecular sieves.

The naphthalocyanine dihydroxide compound is selected to provide the desired naphthalocyanine backbone. The central atom of the naphthalocyanine dihydroxide compound will become the central atom of the final ether capped siloxy substituted naphthalocyanine compound. In order to provide a completely moisture free reaction environment, it is preferred that the dihydroxy compound be refluxed in pyridine, or some other suitable solvent or co-solvent, in order to remove all traces of water azeotropically. It is also preferred to add the nucleophile to the dihydroxy compound and reflux the mixture. The presence of the nucleophile has been found to aid in the azeotropic removal of water.

The $SiR_1R_2L_2$ reactant is selected to provide the siloxy substituent off of the central atom. The halogen L is preferably chlorine, and the $R_1$ and $R_2$ groups are preferably lower alkyl. This reactant is preferably added in excess to the dihydroxy reactant, most preferably after the dihydroxy compound has been subjected to reflux.

The ether capping group compound is then added to the reaction mixture under moisture free conditions. For the purposes of the present invention, addition to the reaction mixture under moisture free conditions refers to the capping group compound being substantially free of moisture and being added in a manner to preclude the capping group compound from picking up any moisture during the addition. Such an addition can be achieved in any possible manner, it being only important that the addition be under conditions to preclude any moisture pickup by the capping group compound.

In a preferred embodiment of the present invention, molecular sieves are used to insure the moisture free conditions. If the capping group compound is a liquid and is to be added as such and if it is not adversely affected by molecular sieves, the compound is dried over molecular sieves to remove any water/moisture. If the capping group compound is a solid and is dissolved in a suitable solvent, e.g., pyridine, for addition to the reaction, the solution is dried over molecular sieves. Upon addition of the capping group compound to the reaction mixture, the addition is also made through a bed of molecular sieves, thereby insuring a moisture free addition.

The process of the present invention therefore results in the effective and efficient preparation of ether capped siloxy substituted naphthalocyanines, and most importantly can provide aromatic ether capped siloxy substituted naphthalocyaines. During the preparation, mixtures of the monomeric and polymeric forms of the naphthalocyanine compounds are obtained whenever a difunctional capping group compound is used. This mixture, if desired, can be separated using conventional chromatographic techniques. The mixture, however, can be and is preferably used in applications, such as in the formulation of an information layer for an optical recording medium. Use of a capping group compound containing a single reactive functional group, of course, results in but a single, simple compound.

The use of these chromophores in an optical information medium allows for the intense absorption of light within a wavelength range of about 750 nm to about 850 nm. The optical properties of the chromophores are excellent and provide one with a most stable, sensitive and efficient optical information medium.

In using the chromophores, it is preferred that the chromophores of the present invention be cast from solution. The chromophores can be used as a one-component material, i.e., chromophore only material, or used in combination with a polymer. Thus it is preferred to either cast a chromophore layer or coat a substrate with a polymer/chromophore film. Conventional methods of casting may be utilized with the chromophores of the present invention.

Since the read and write steps all require operating within a very narrow depth of focus, the film, when applied, must provide a very flat surface in order to avoid errors and noise. In order to facilitate the coating procedure, the polymer, if used, and chromophore should be compatible and mutually cosoluble. Also, upon evaporation of the solvent, the chromophore should not precipitate in a particulate form, which particulates would cause a scattering of light.

Any suitable coating technique may be used to achieve such a flat surface, with a conventional technique such as spin coating, which allows for a high degree of control of film thickness and flatness, being preferred. It is of course, important that the polymer form a thin film coating.

The substrate which is coated with the material should generally possess a surface of suitable smoothness. This may be imparted by appropriate molding or other forming techniques when the substrate is made. If the substrate has an inadequately smooth surface, a smoothing or subbing polymer layer may be used to attain the appropriate smoothness. Such smoothing or subbing layer should not, of course, interfere with the application or utilization of the recording layer which is subsequently applied thereto. The subbing layer can contain preformatting information. A preferred subbing layer is a layer of polyvinyl alcohol or an acrylate formulation. The substrate may be optically featureless or may contain preformatting information (e.g., tracking groove and/or encoded information in the form of readable marks).

The material of which the substrate is comprised is generally a material exhibiting good mechanical strength and good structural integrity against warping. Examples of suitable materials include aluminum, glass, reinforced glass, ceramics, polymethacrylates, polyacrylates, polycarbonates, phenolic resins, epoxy resins, polyesters, polyimides, polyether sulfones, polyether ketones, polyolefins, polyphenylene sulfide and nylon. Polycarbonate and polymethylmethacrylate are preferred materials for use as a substrate. Furthermore, the shape and size of the substrate, and hence the recording medium, can vary depending on the application. The shape and format, for example, may be a disk, tape, belt or drum. A disk shape or tape format is most preferred.

The actual structure of the recording medium itself may also vary in that the recording layer may be coated on one side or both sides of the substrate. Or, two substrates having the recording layer on either side can be combined allowing the sides having the recording layers to face each other at a constant distance, the combined substrates being sealed to prevent dust contamination and scratches.

The medium of this invention may also have an undercoating layer such as a metal reflective layer or layer of various resins on the substrate if necessary, with the recording layer being coated over it. In addition, various thermoplastic resins, thermosetting resins, UV or electron beam cured resins, may be used as an undercoating material. Furthermore, it is possible to laminate layers from the substrate as follows: a reflective layer, undercoating layer and recording layer. In addition, guiding grooves may be installed on the substrate, and the recording layer may be installed on the extruded portions and/or intruded portions of the grooves. Furthermore, if necessary, a reflective layer or opaque lay may be installed over the recording layer.

A suitable protective layer or cover, such as those known to the art, can also be used if desired to protect the recording layer from dirt, dust, scratches or abrasion.

In addition to the chromophore material or polymer/chromophore material, the recording layer may also contain other polymers or oligomers, various plasticizers, surfactants, antistatic agents, smoothening agents, flame retardants, stabilizers, dispersants, leveling agents, antibleeding agents, antioxidants, water repellants, emulsifiers, etc. as may be desired. The effect the presence of such additives may have on the optical properties of the medium, however, should be taken into account.

The following examples are provided in order to further illustrate the present invention. The examples are in no way meant to be limitative, but merely illustrative.

COMPARATIVE EXAMPLE

Unsuccessful Preparation of SiNc
$(OSiMe_2—O—C_6H_4—C(CH_3)_2—C_6H_4—OH)_2$

To a 1000 ml 3 neck flask, fitted with magnetic stirrer, Dean-Stark adapter with thermometer and condenser, $N_2$ sparge, thermometer and heating mantle, 600 ml of dry pyridine was added. Dihydroxy silicon naphthalocyanine (4 g) and tributylamine (40 g) were added, stirred and heated to reflux. 100 ml of distillates were removed and the water level was found to be less than 100 ppm level. It was cooled down to room temperature, and via syringe 16 ml of dichlorodimethylsilane was added. The mixture was stirred at room temperature overnight.

It was heated back up to reflux and all excess dichlorodimethylsilane was distilled off. Bisphenol-A (1.2 g) was dissolved in 20 ml dry pyridine and added to the mixture. It was refluxed for 4 hours, and then filtered hot. The residue was washed with 5 ml pyridine and then dried and analyzed. It was found to be a mixture of dimethylsilanol-capped silicon naphthalocyanine, (SiNc) $[0—SiMe_2—OH]_2$, and its oligomers. The filtrates were acidified by pouring into water acidified with HCl. No product was obtained.

EXAMPLE 1

Successful Preparation Of SiNc[O—Si(Phenyl)$_2$O—C$_6$H$_4$—C(CH$_3$)$_2$—C$_6$H$_4$—OH]$_2$, from Bisphenol-A, Dihydroxy silicon naphthalocyanine and Si(Phenyl)$_2$Cl$_2$ A 500 ml 4 neck flask was fitted with a thermometer, rubber septum, stopper, Dean stark adapter (with a thermometer and condenser), magnetic stirrer, N$_2$ purge and heating mantle. Dry pyridine (280 ml), tributylamine (20 ml) and SiNc(OH)$_2$ (2 g) were added and heated to reflux. 50 ml of azeotrope was removed, when water level was found to be less than 100 ppm level. It was cooled to below 100° C. and Si(Phenyl)$_2$Cl$_2$ (2 ml) was syringed in. It was stirred at room temperature overnight. Bisphenol-A (3 g) had been kept in an oven at 70° C. overnight; it was dissolved in 20 ml dry pyridine inside a glove bag. An addition funnel with some glass wool at the bottom which had also been sitting inside the oven was taken out of the oven and some sieves were taken inside the addition funnel. The stopper on the reaction flask was replaced by this addition funnel. The bisphenol-A solution was rapidly transferred to the addition funnel and drained into the reaction flask rapidly so it would flow over the sieves to remove any moisture. After addition, the stopper was replaced, and the mixture refluxed for 4 hours. It was filtered hot; there was practically no residue. The dark green filtrates were cooled to room temperature and poured with stirring into acidified water of pH 1. The dark green precipitate was filtered, washed with water and dried (5 g).

Since bisphenol-A is soluble in methanol at room temperature, the above solid was repeatedly extracted with methanol (4×100 ml) and filtered each time. The final green residue was dried (2.8 g). This was dissolved in 200 ml of 1,1,2-trichloroethane by heating on a steambath for 10 minutes and filtered hot. There were no insolubles. The filtrates were rotary evaporated to leave shiny blue-green solid (2.7 g). Thin Layer Chromatography showed this to be a single spot material, different from the starting materials. NMR and IR confirmed the structure to be the desired one, in mixture with its polymers.

EXAMPLE 2

Successful Preparation of SiNc[O—SiMe$_2$—O—C$_6$H$_4$—C(CH$_3$)$_2$—C$_6$H$_4$—OH]$_2$ from SiNc (OH)$_2$, SiMe$_2$Cl$_2$ and Bisphenol A The reaction scheme of Example 1 was followed, with SiMe$_2$Cl$_2$ replacing Si(Phenyl)$_2$Cl$_2$. Also, due to the higher volatility of SiMe$_2$Cl$_2$, a much larger excess of it was taken into the reaction mixture. Before addition of the bisphenol-A solution into the flask, however, that excess was evaporated off.

Handling of the bisphenol-A solution was done under strictly anhydrous conditions as in Example 1 and also its addition into the reaction flask was done over molecular sieves in an addition funnel as in Example 1. Identical work-up yielded 0.5 gram of blue-green solid which was found to be the desired compound, in mixture with its polymers, as confirmed by NMR and IR analysis.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A naphthalocyanine compound containing a central hetero atom having a siloxy group substituent off of said hetero atom, with said siloxy substituent having the formula —OSiR$_1$R$_2$—ZAr wherein R$_1$ and R$_2$ can be the same or different, and can be alkyl having from 1 to about 18 carbons; aryl having from 6 to 10 carbons; cycloalkyl having at least 4 carbons or alkoxy having at least 3 carbons, Z is O or S, and Ar is an aromatic moiety.

2. The naphthalocyanine compound of claim 1, wherein Ar contains from 6 to 14 carbon atoms.

3. The naphthalocyanine compound of claim 1, wherein Ar is comprised of a phenyl or naphthyl moiety.

4. The naphthalocyanine compound of claim 3, wherein the phenyl or naphthyl moiety is substituted with a halogen, NO$_2$, hydroxy, alkyl, alkoxy, —COCH$_3$, aryloxy or aryl substituent.

5. The naphthalocyanine compound of claim 1, wherein Ar is selected from the group consisting of

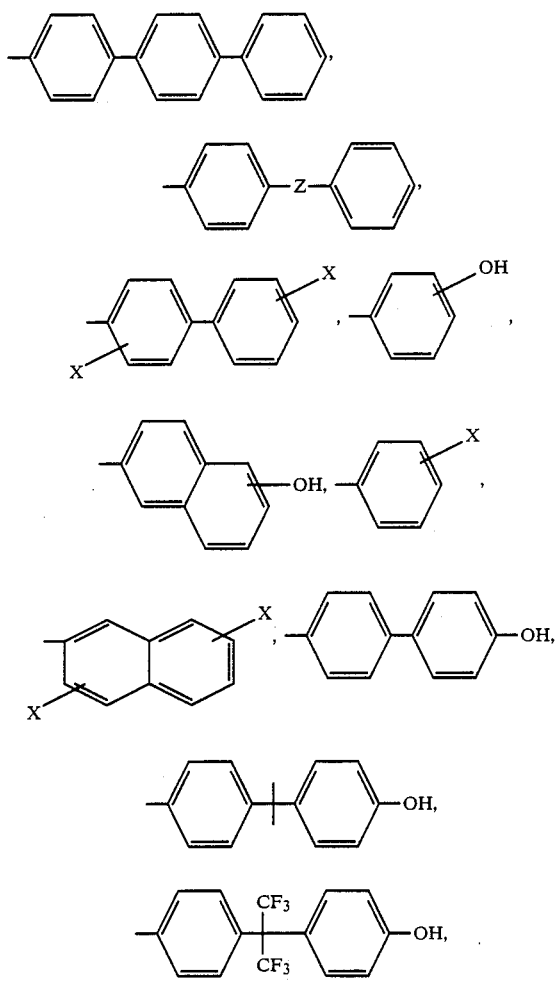

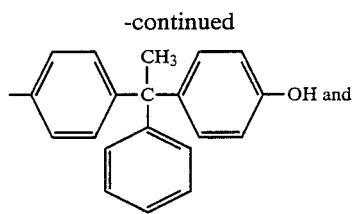

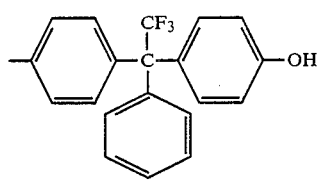

wherein Z is O or S, and X is H, halogen, NO$_2$, alkyl, alkoxy, - COCH$_3$, aryloxy or aryl.

6. The naphthalocyanine compound of claim 1, wherein the central hetero atom is Si, Ge, Sn, Al, Ga, In or a transition metal.

7. The naphthalocyanine compound of claim 1, wherein the central hetero atom is Si, Ge or Sn.

8. A naphthalocyanine compound of the general formula (YNc)[OSiR$_1$R$_2$—ZAr]$_n$ wherein
Y is Si, Ge, Sn, Al, Ga, In or a transition metal,
Nc is a naphthalocyanine moiety
R$_1$ and R$_2$ can be the same or different and can be alkyl having from 1 to about 18 carbons; aryl having from 6 to 10 carbons; cycloalkyl having at least 4 carbons or alkoxy having at least 3 carbons,
Z is O or S,
Ar is an aromatic moiety, and
n is 1 or 2.

9. The naphthalocyanine compound of claim 8, wherein Y is Si.

10. The naphthalocyanine compound of claim 8, wherein n is 2.

11. The naphthalocyanine compound of claim 8, wherein Ar contains from 6 to 14 carbon atoms.

12. The naphthalocyanine compound of claim 8, wherein Ar is comprised of a phenyl or naphthyl moiety.

13. The naphthalocyanine compound of claim 12, wherein the phenyl or naphthyl moiety is substituted with a halogen, NO$_2$, hydroxy, alkyl, alkoxy, —COCH$_3$, aryloxy or aryl substituent.

14. The naphthalocyanine compound of claim 8, wherein Ar is selected from the group consisting of

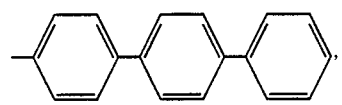

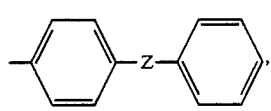

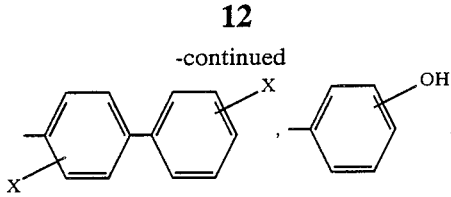

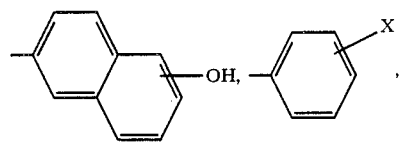

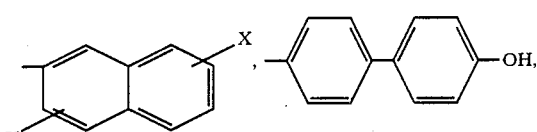

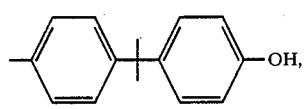

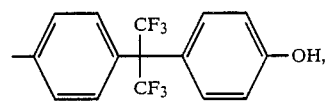

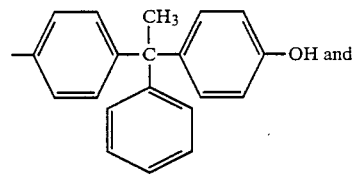

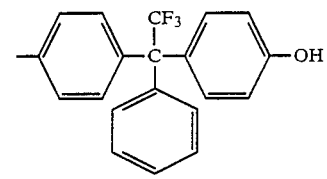

wherein Z is O or S, and X is H, halogen, NO$_2$, alkyl, alkoxy, —COCH$_3$, aryloxy or aryl.

15. A polymerized naphthalocyanine of the general formula

[R$_1$R$_2$YO—(YNc)—OYR$_1$R$_2$—O—Ar—O]$_m$ wherein
Y is Si, Ge or Sn,
Nc is a naphthalocyanine moiety,
R$_1$ and R$_2$ can be the same or different and can be alkyl having from 1 to about 18 carbons; aryl having from 6 to 10 carbons; cycloalkyl having at least 4 carbons or alkoxy having at least 3 carbons,
Ar is an aromatic moiety, and
m is greater than 2.

16. The polymerized naphthalocyanine of claim 15, wherein Y is Si.

17. The polymerized naphthalocyanine of claim 15, wherein Ar contains from 6 to 14 carbon atoms.

18. The polymerized naphthalocyanine of claim 15, wherein Ar is comprised of a phenyl or naphthyl moiety.

19. The polymerized naphthalocyanine of claim 18, wherein the phenyl or naphthyl moiety is substituted with a halogen, NO₂, hydroxy, alkyl, alkoxy, —COCH₃, aryloxy or aryl substituent.

20. The polymerized naphthalocyanine of claim 15, wherein Ar is selected from the group consisting of

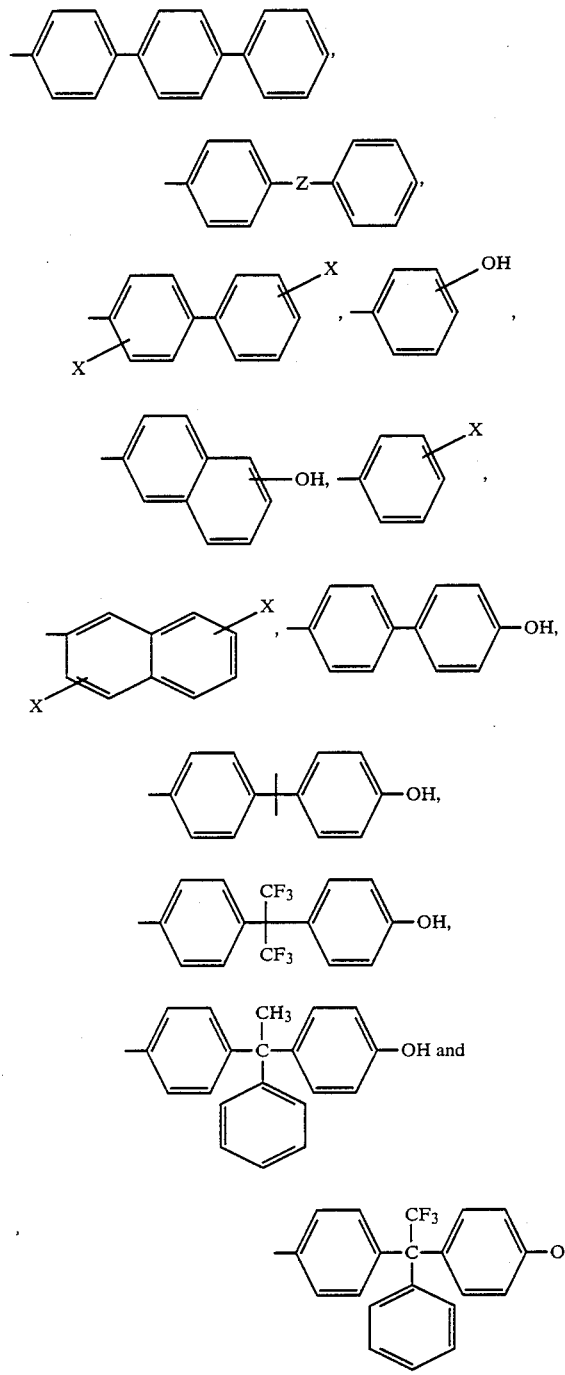

wherein Z is O or S, and X is H, halogen, NO₂, alkyl, alkoxy, —COCH₃, aryloxy or aryl.

21. A process for preparing a naphthalocyanine compound containing a central hetero atom having a siloxy group substituent off of said hetero atom, with said siloxy group containing a terminal ether function, which process comprises reacting in the presence of a nucleophile in a moisture free environment (i) a naphthalocyanine dihydroxy compound, (ii) a compound of the formula $SiR_1R_2L_2$ wherein $R_1$ and $R_2$ can be the same or different and can be alkyl having from 1 to about 18 carbons; aryl having from 6 to 10 carbons; cycloalkyl having at least 4 carbons or alkoxy having at least 3 carbons, and L is a halogen, and (iii) an ether capping group compound, wherein the ether capping group compound is prepared in substantially moisture free form and added to the reaction medium under moisture free conditions so as to preserve the moisture free environment and increase the yield of the reaction.

22. The process of claim 21, wherein the naphthalocyanine dihydroxy compound is silicon naphthalocyanine dihydroxy and L is chlorine.

23. The process of claim 21, wherein the ether capping group compound is added to the reaction mixture through a bed of molecular sieves.

24. The process of claim 23, wherein the ether capping group compound is added in a solution which has been dried over a bed of molecular sieves.

25. The process of claim 21, wherein the reaction takes place in a reaction medium comprised of pyridine.

26. The process of claim 21, wherein the ether capping group compound is an aromatic ether capping group compound.

27. The process of claim 26, wherein the naphthalocyanine dihydroxy compound is a silicon naphthalocyanine dihydroxy and L is chlorine.

28. The process of claim 26, wherein the aromatic ether capping group compound is added to the reaction mixture through a bed of molecular sieves.

29. The process of claim 28, wherein the ether capping group compound is added in a solution which has been dried over a bed of molecular sieves.

30. The process of claim 26, wherein the reaction takes place in a reaction medium comprised of pyridine.

31. An optical information medium comprising an optical information layer, which information layer comprises the siloxy substituted naphthalocyanine of claim 1.

32. An optical information medium comprising an optical information layer, which information layer comprises the siloxy substituted naphthalocyanine of claim 8.

33. An optical information medium comprising an optical information layer, which information layer comprises the siloxy substituted naphthalocyanine of claim 15.

34. A laser printer paper which contains in its printing layer the siloxy substituted naphthalocyanine of claim 1.

35. A laser printer paper which contains in its printing layer the siloxy substituted naphthalocyanine of claim 8.

36. A laser printer paper which contains in its printing layer the siloxy substituted naphthalocyanine of claim 15.

* * * * *